US012756645B1

(12) United States Patent
Hearn et al.

(10) Patent No.: US 12,756,645 B1
(45) **Date of Patent: *Oct. 6, 2026**

(54) INTEGRATED NETWORK TESTING FOR VIRTUAL CONFERENCING

(71) Applicant: Zoom Video Communications, Inc., San Jose, CA (US)

(72) Inventors: Russell Charles Hearn, Dallas, TX (US); Nicholas Alexander Sieracki, Sylmar, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/612,168

(22) Filed: Mar. 21, 2024

Related U.S. Application Data

(63) Continuation of application No. 17/874,864, filed on Jul. 27, 2022, now Pat. No. 12,021,715.

(51) Int. Cl.
*H04L 43/08* (2022.01)
*H04L 12/18* (2006.01)
(Continued)

(52) U.S. Cl.
CPC .............. *H04L 43/08* (2013.01); *H04L 43/20* (2022.05); *H04L 43/50* (2013.01); *H04L 65/403* (2013.01);
(Continued)

(58) Field of Classification Search
CPC ................. G06F 9/45529; G06F 9/455; G06F 2221/034; G06F 11/3672; H04L 51/04;
(Continued)

(56) References Cited

U.S. PATENT DOCUMENTS

| | | | | |
|---|---|---|---|---|
| 9,274,935 | B1 * | 3/2016 | Lachwani | G06F 9/44505 |
| 10,430,324 | B2 | 10/2019 | Hamid et al. | |

(Continued)

FOREIGN PATENT DOCUMENTS

| | | | |
|---|---|---|---|
| CN | 104378630 | A | 2/2015 |
| CN | 108270622 | A | 7/2018 |

(Continued)

OTHER PUBLICATIONS

Goth, "Testing techniques for mobile device applications" 2015, Masaryk University Faculty of Informatics, pp. 8-13, 23-52 (Year: 2015).*

(Continued)

*Primary Examiner* — Rachel J Hackenberg
(74) *Attorney, Agent, or Firm* — Kilpatrick Townsend & Stockton LLP

(57) ABSTRACT

One example method includes receiving, by a network test engine of a conference client application executed by a client device, a script associated with network functionality provided by a conference client application, the network test engine dynamically installable into the conference client application; accessing, by the network test engine, functionality of the conference client application; initiating, by the network test engine via the conference client application, functionality of the conference client application based on the script; monitoring, by the network test engine, one or more parameters of network communications employed by the functionality, the network communications between the conference client application and a virtual conference provider; and providing an indication of network communications status based on the monitored one or more parameters.

20 Claims, 12 Drawing Sheets

(51) Int. Cl.
*H04L 43/20* (2022.01)
*H04L 43/50* (2022.01)
*H04L 65/403* (2022.01)

(52) U.S. Cl.
CPC ...... *H04L 12/1822* (2013.01); *H04L 12/1827* (2013.01)

(58) Field of Classification Search
CPC ............. H04L 12/1813; H04L 12/1827; H04L 12/1822; H04L 65/403; H04L 65/4038; H04L 65/4046; H04L 65/40; H04L 43/00; H04L 43/50; H04L 43/08; H04L 43/20; H04L 65/4053
See application file for complete search history.

(56) References Cited

U.S. PATENT DOCUMENTS

| | | | | |
|---|---|---|---|---|
| 11,090,569 | B1 * | 8/2021 | Wu | A63F 13/67 |
| 11,349,890 | B2 | 5/2022 | Spencer et al. | |
| 11,474,934 | B1 | 10/2022 | Pereira | |
| 12,021,715 | B2 * | 6/2024 | Hearn | H04L 43/50 |
| 2016/0088259 | A1 | 3/2016 | Anderson et al. | |
| 2016/0373944 | A1 * | 12/2016 | Jain | H04L 41/5032 |
| 2017/0111844 | A1 * | 4/2017 | Routt | H04W 40/12 |
| 2018/0368010 | A1 * | 12/2018 | Mitchell | H04L 41/0645 |
| 2021/0337405 | A1 * | 10/2021 | Sato | H04W 8/24 |

FOREIGN PATENT DOCUMENTS

| | | | |
|---|---|---|---|
| CN | 114338489 | A | 4/2022 |
| CN | 114760461 | A | 7/2022 |

OTHER PUBLICATIONS

U.S. Appl. No. 17/874,864 , “Non-Final Office Action”, Mar. 16, 2023, 24 pages.
U.S. Appl. No. 17/874,864 , “Notice of Allowance”, Dec. 22, 2023, 13 pages.
Goth , “Testing Techniques for Mobile Device Applications”, Masaryk University, 2015, pp. 1-67.
Subramonian , et al., “Automated Testing of a Converged Conferencing Application”, 2009, pp. 101-105.

* cited by examiner

INTEGRATED NETWORK TESTING FOR VIRTUAL CONFERENCING

CROSS REFERENCE PARAGRAPH FOR PRIORITY

This application is continuation of U.S. Non-Provisional application Ser. No. 17/874,864, filed on Jul. 27, 2022, and titled "INTEGRATED NETWORK TESTING FOR VIRTUAL CONFERENCING," which is hereby incorporated by reference in its entirety for all purposes.

FIELD

This application generally relates to virtual conferencing and more particularly relates to integrated network testing for virtual conferencing.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
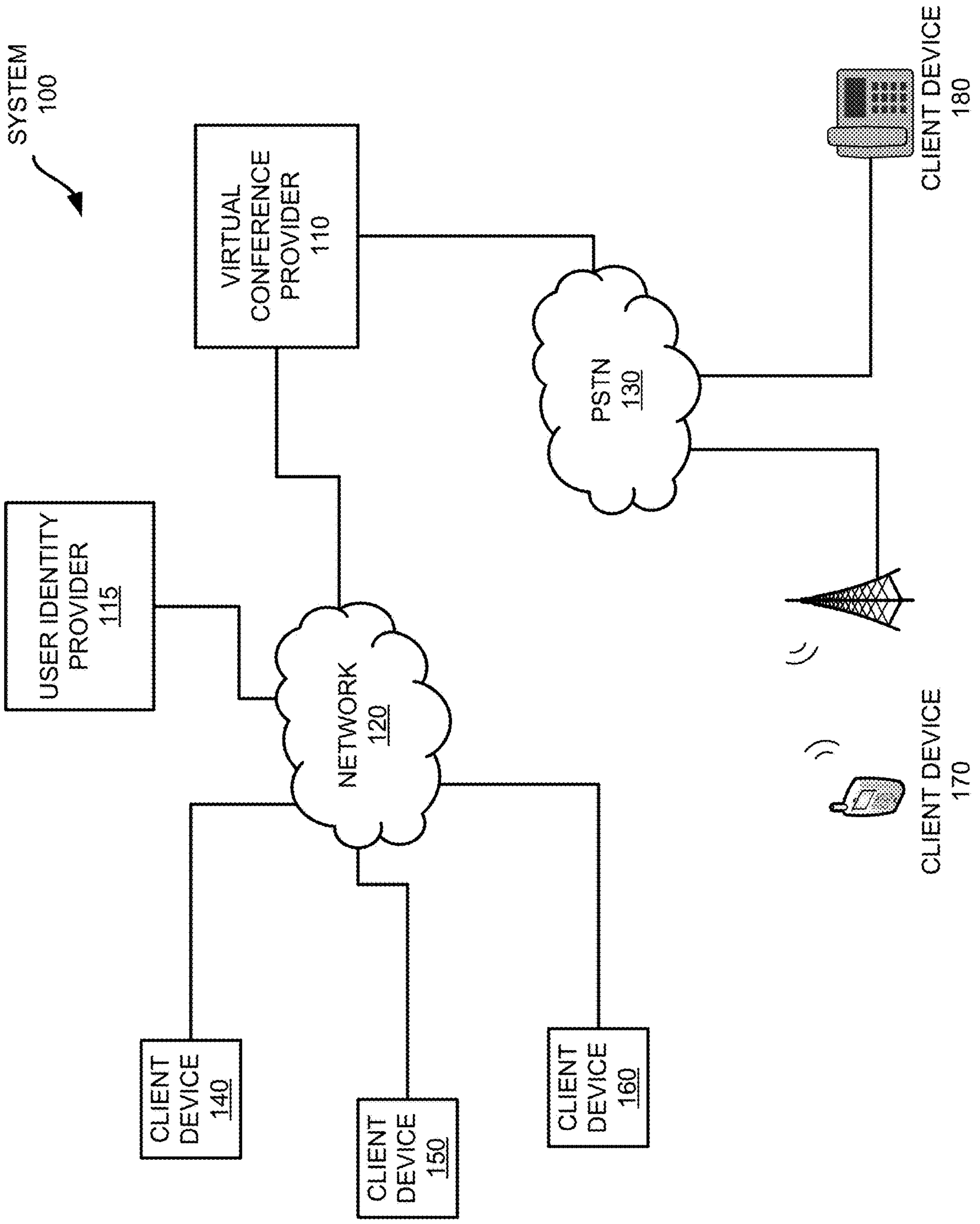
FIGS. 1-3 are example systems for integrated network testing for virtual conferencing.

Examples are described herein in the context of integrated network testing for virtual conferencing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Virtual conference providers can enable people to interact with each other using their own computers (or "client devices") or other devices, such as smartphones or video conference rooms, with both video and audio in a variety of settings, such as in one-on-one conversations, group meetings, and webinars, that may include different types of content, including screen or application sharing in addition to sharing audio and video streams. While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters. Thus, in a webinar, interaction tends to be mostly one-way: from the presenter(s) to the audience. In addition, webinars can have very large numbers of participants, potentially numbering in the thousands or tens of thousands.

People participate in virtual conferences for a wide variety of reasons, such as to keep in touch with family, conduct business, or manage groups or organizations. Frequently, people attend virtual conferences using their own personal client device, such as a desktop or laptop computer, tablet, or smartphone. However, as a result, they may join virtual conferences from locations with slow or unreliable network connections, which can impact the quality of audio or video streams transmitted by their client device to the virtual conference provider and other participants in the virtual conference. In other cases, network connectivity between the participant and the virtual conference provider may be disrupted by other issues, such as network congestion, failures of network components, incorrectly configured routers or firewalls, and myriad other causes. However, to the participant, they simply experience degradation or loss of audio or video or other communication problems with the virtual conference provider, such as difficulties starting or joining a virtual conference.

Determining the cause of connectivity issues can be difficult, particularly when those issues may result from settings within software or network components that are not generally available to network monitoring tools. For example, a user may be able to run a standalone network test suite to determine network conditions within the user's own local area network ("LAN") or between the user's LAN and the virtual conference provider. However, such testing is not geared towards the type of multimedia traffic exchanged during a virtual conference. In addition, access to the virtual conference provider is restricted to authorized users and software, e.g., a virtual conferencing application or other applications provided by a cloud communications platform, including phone calls and chats. Thus, conventional network testing would not be able to interact with the virtual conference provider to obtain more detailed network connectivity information. In addition, most computer users are not network engineers and are not familiar with network testing or troubleshooting. As a result, most would simply be frustrated when audio or video quality degrades or they are unable to host or join virtual conference and unable to take any steps to address the underlying issues.

To address these issues, a self-contained network test engine (or "network test engine") may be downloaded and installed into previously installed virtual conference software on a user's client device. The network test engine provides an API framework that can be integrated into the virtual conference software to enable the network test engine to directly communicate with different functionality within the virtual conference software. Thus, the installed network test engine is exposed to the various functionality available via the virtual conference software, such as obtaining control over video and audio equipment, obtaining access to video and audio feeds sent and received by the virtual conference software, and obtaining access to a network protocol stack (or "protocol stack") to monitor packetized data at different layers of the protocol stack while being sent or received as well as network performance over or configuration of a local area network ("LAN"). In addition, because the network test engine is provided by the virtual conference provider and executes alongside the conference client application, it can communicate directly with the virtual conference provider via the conference client application and obtain access to networking information associated with the virtual conference provider that otherwise would be inaccessible to conventional network testing and diagnostic tools.

To test different functionality within the virtual conference application, the user can select the functionality to test and an appropriate test script is provided to the network test engine. The test script controls the interactions between the network test engine and the virtual conference software and specifies the tests to be performed and how they are to be performed. For example, a test script may specify that a camera and microphone on the client device are to be activated to capture audio and video streams, and that the audio and video streams are to be provided to the virtual conference provider, such as part of a simulated virtual conference. The network test engine can then monitor the movement of data through the conference client application and across the network to the virtual conference provider. Similarly, the network test engine can monitor inbound data traffic from the virtual conference provider, such as video or audio streams, and its progress through the virtual conference software before being output. Such integrated access to the virtual conference software can help identify apparent networking issues as well as issues that may present as network-related, but are related to other issues, such as processor or memory utilization. The results of the testing can then be provided to the user or the virtual conference provider, or both, who can then attempt to correct any issues.

This illustrative example is given to introduce the reader to the general subject matter discussed herein and the disclosure is not limited to this example. The following sections describe various additional non-limiting examples and examples of integrated network testing for virtual conferencing.

Referring now to FIG. 1, FIG. 1 shows an example system 100 that provides videoconferencing functionality to various client devices. The system 100 includes a virtual conference provider 110 that is connected to multiple communication networks 120, 130, through which various client devices 140-180 can participate in virtual conferences hosted by the virtual conference provider 110. For example, the virtual conference provider 110 can be located within a private network to provide video conferencing services to devices within the private network, or it can be connected to a public network, e.g., the internet, so it may be accessed by anyone. Some examples may even provide a hybrid model in which a virtual conference provider 110 may supply components to enable a private organization to host private internal virtual conferences or to connect its system to the virtual conference provider 110 over a public network.

The system optionally also includes one or more user identity providers, e.g., user identity provider 115, which can provide user identity services to users of the client devices 140-160 and may authenticate user identities of one or more users to the virtual conference provider 110. In this example, the user identity provider 115 is operated by a different entity than the virtual conference provider 110, though in some examples, they may be the same entity.

Figure 2:
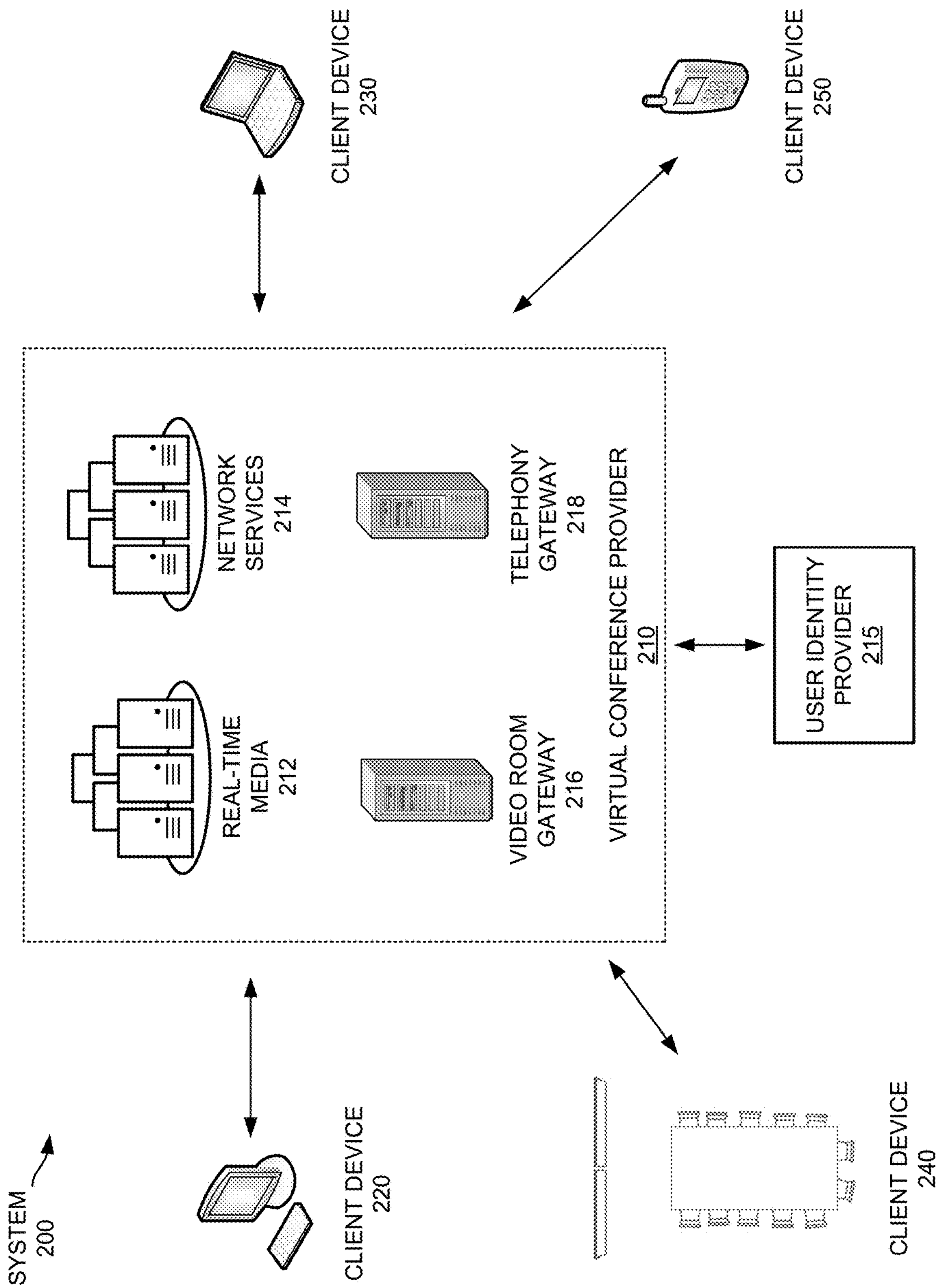

Virtual conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the virtual conference provider 110.

Meetings in this example virtual conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the virtual conference provider 110, a user may contact the virtual conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the virtual conference provider 110 may prompt the user for certain information, such as a date, time, and duration for the meeting, a number of participants, a type of encryption to use, whether the meeting is confidential or open to the public, etc. After receiving the various meeting settings, the virtual conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The virtual conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the virtual conference provider 110. They also receive audio or video information from the virtual conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The virtual conference provider 110 may also invalidate the meeting information, such as the meeting identifier or password/passcode.

To provide such functionality, one or more client devices 140-180 may communicate with the virtual conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the virtual conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a virtual conference meeting hosted by the virtual conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the virtual conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the virtual conference provider 110 using network 120 and may provide information to the virtual conference provider 110 to access functionality provided by the virtual conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the virtual conference provider 110.

A user identity provider 115 may be any entity trusted by the virtual conference provider 110 that can help identify a user to the virtual conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the virtual conference provider 110.

When the user accesses the virtual conference provider 110 using a client device, the virtual conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the virtual conference provider 110 either provides or denies access to its services, respectively.

For telephony devices, e.g., client devices 170-180, the user may place a telephone call to the virtual conference provider 110 to access virtual conference services. After the call is answered, the user may provide information regarding a virtual conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the virtual conference provider 110. For example, telephony devices may be unable to provide user identification information to identify the telephony device or the user to the virtual conference provider 110. Thus, the virtual conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the virtual conference provider

110, even in cases where the user has an authenticated identity and employs a client device capable of identifying the user to the virtual conference provider 110. The virtual conference provider 110 may determine whether to allow such anonymous users to use services provided by the virtual conference provider 110. Anonymous users, regardless of the reason for anonymity, may be restricted as discussed above with respect to users employing telephony devices, and in some cases may be prevented from accessing certain meetings or other services, or may be entirely prevented from accessing the virtual conference provider 110.

Referring again to virtual conference provider 110, in some examples, it may allow client devices 140-160 to encrypt their respective video and audio streams to help improve privacy in their meetings. Encryption may be provided between the client devices 140-160 and the virtual conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the virtual conference provider 110, while allowing the virtual conference provider 110 to access the decrypted multimedia streams to perform certain processing, such as recording the meeting for the participants or generating transcripts of the meeting for the participants. End-to-end encryption may be used to keep the meeting entirely private to the participants without any worry about a virtual conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the virtual conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a virtual conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the virtual conference provider 210 over a communications network, such as the internet for client devices 220-240 or the PSTN for client device 250, generally as described above with respect to FIG. 1. The virtual conference provider 210 is also in communication with one or more user identity providers 215, which can authenticate various users to the virtual conference provider 210 generally as described above with respect to FIG. 1.

In this example, the virtual conference provider 210 employs multiple different servers (or groups of servers) to provide different aspects of virtual conference functionality, thereby enabling the various client devices to create and participate in virtual conference meetings. The virtual conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more virtual conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the virtual conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the virtual conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the virtual conference provider 210 may receive multimedia streams from the various participants and publish those streams to the various participants to subscribe to and receive. Thus, the virtual conference provider 210 notifies a client device, e.g., client device 220, about various multimedia streams available from the other client devices 230-250, and the client device 220 can select which multimedia stream(s) to subscribe to and receive. In some examples, the virtual conference provider 210 may provide to each client device the available streams from the other client devices, but from the respective client device itself, though in other examples it may provide all available streams to all available client devices. Using such a multiplexing technique, the virtual conference provider 210 may enable multiple different streams of varying quality, thereby allowing client devices to change streams in real-time as needed, e.g., based on network bandwidth, latency, etc.

As mentioned above with respect to FIG. 1, the virtual conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the virtual conference provider 210 may allow a meeting participant to notify it of inappropriate behavior or content in a meeting. Such a notification may trigger the real-time media servers to 212 record a portion of the meeting for review by the virtual conference provider 210. Still other functionality may be implemented to take actions based on the decrypted multimedia streams at the virtual conference provider 210, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the virtual conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the virtual conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the virtual conference provider 210 under a supervisory set of servers. When a client device 220-250 accesses the virtual conference provider 210, it will typically communicate with one or more network services servers 214 to access their account or to participate in a meeting.

When a client device 220-250 first contacts the virtual conference provider 210 in this example, it is routed to a network services server 214. The client device may then provide access credentials for a user, e.g., a username and password or single sign-on credentials, to gain authenticated access to the virtual conference provider 210. This process may involve the network services servers 214 contacting a user identity provider 215 to verify the provided credentials. Once the user's credentials have been accepted, the client device 214 may perform administrative functionality, like updating user account information, if the user has an identity with the virtual conference provider 210, or scheduling a new meeting, by interacting with the network services servers 214.

In some examples, users may access the virtual conference provider 210 anonymously. When communicating anonymously, a client device 220-250 may communicate with one or more network services servers 214 but only provide information to create or join a meeting, depending on what features the virtual conference provider 210 allows for anonymous users. For example, an anonymous user may access the virtual conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the virtual conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the virtual conference provider 210. For example, the video conferencing hardware may be provided by the virtual conference provider 210 to one or more of its subscribers, which may provide access credentials to the video conferencing hardware to use to connect to the virtual conference provider 210.

The video room gateway servers 216 provide specialized authentication and communication with the dedicated video conferencing hardware that may not be available to other client devices 220-230, 250. For example, the video conferencing hardware may register with the virtual conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the virtual conference provider 210.

Referring now to the telephony gateway servers 218, these servers 218 enable and facilitate telephony devices' participation in meetings hosed by the virtual conference provider 210. Because telephony devices communicate using the PSTN and not using computer networking protocols, such as TCP/IP, the telephony gateway servers 218 act as an interface that converts between the PSTN and the networking system used by the virtual conference provider 210.

For example, if a user uses a telephony device to connect to a meeting, they may dial a phone number corresponding to one of the virtual conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the virtual conference provider 210 discussed above are merely examples of such devices and an example architecture. Some virtual conference providers may provide more or less functionality than described above and may not separate functionality into different types of servers as discussed above. Instead, any suitable servers and network architectures may be used according to different examples.

Figure 3:
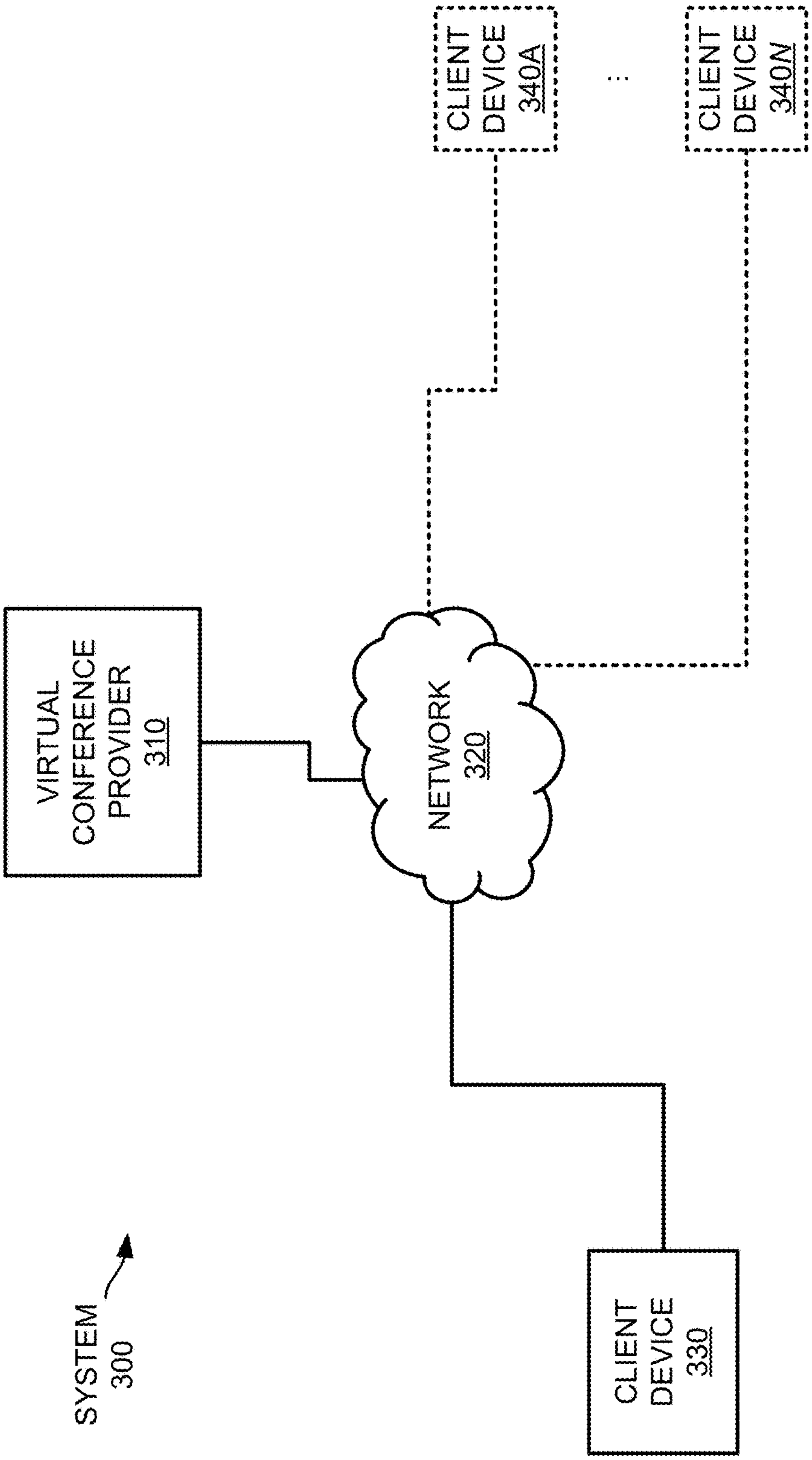

Referring now to FIG. 3, FIG. 3 shows an example system 300 for integrated network testing for virtual conferencing. This example system includes a client device 330 and a virtual conference provider 310 that are connected to each other by one or more communications networks, represented by network 320. The system 300 can also include one or more client devices 340*a-n*, or one or more client devices 340*a-n* can be simulated by the virtual conference provider 310 during the course of a network test, such as to provide simulated audio or video streams. Thus, for purposes of this description, the client devices 340*a-n* may be actual client devices or virtual (or simulated) client devices.

As will be described in more detail below, the client deice 330 executes a virtual conferencing application to interact with the virtual conference provider 310, such as by joining a virtual conference hosted by the virtual conference provider 310. In a virtual conference, other participants may join using their respective client devices 340*a-n* and the participants may interact by exchanging audio or video feeds, generally as described above. However, the conference client application may also allow a user to select an option to test network connectivity, either within the context of an on-going virtual conference or without first joining a virtual conference.

While the example shown in FIG. 3 identifies a virtual conference provider 310, it should be appreciated that the virtual conference provider 310 may provide broader communications services to its customers than just virtual conferences. For example, the virtual conference provider 310 can provide telephony functionality, including voice-over-IP ("VOIP") phone calls, and text chat. Thus, a virtual conference provider 310 can provide a cloud communications platform in some examples. Moreover, the integrated network testing described herein can be used in conjunction with client applications that provide such communications functionality and are not restricted to only a virtual conference context.

Figure 4:
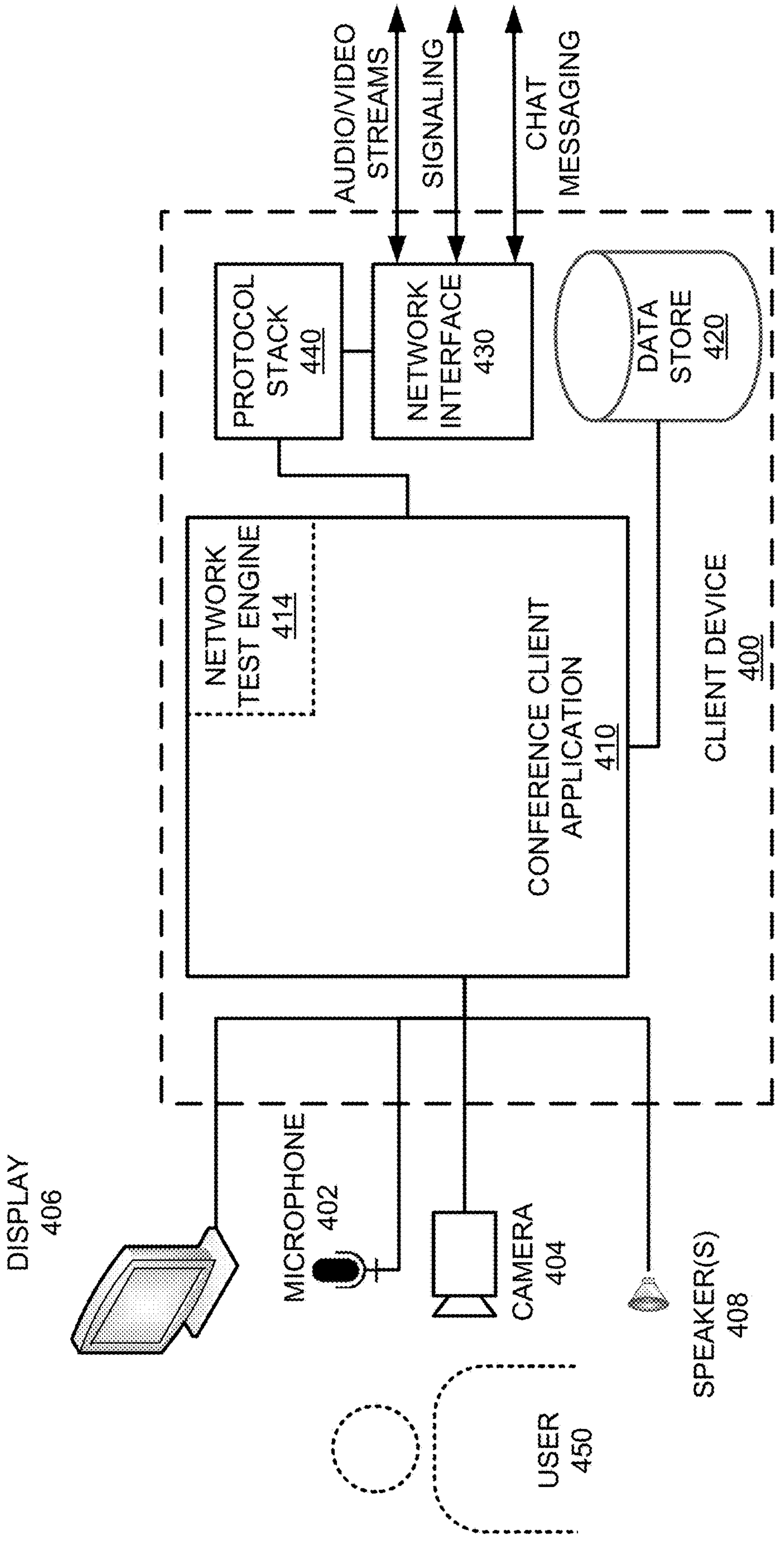
FIG. 4 shows an example client device for integrated network testing for virtual conferencing.

Referring now to FIG. 4, FIG. 4 illustrates a client device 400 that executes a virtual conference client application 410 (or "client application"). The client application 410 provides functionality to enable the user 450 to join and participate in virtual conferences, as discussed above with respect to FIGS. 1-3. In addition, the client application 410 may allow other functionality, such as text chat functionality, conference scheduling, person-to-person voice chats (similar to a conventional telephone call), or any other suitable functionality.

To enable this functionality, the client application 410 interacts with various input and output devices, such as a microphone 402 and camera 404, and display 406 and speaker(s) 408. The client application 410 can control the microphone 402 and camera 404 to capture audio and video streams to the virtual conference provider, the display 406 to present a graphical user interface ("GUI") for the user 450 to interact with, which may include video output from received video streams, and the speaker(s) 408 to output received audio streams.

The conference application 410 interacts with a network interface 430 to exchange data with the virtual conference provider, including video and audio streams, signaling information, and chat messaging. The conference application 410 may interact with the network interface 430 via a protocol stack 440 that enables data from the client application 410, such as video or audio data, to be packetized (or otherwise prepared for transmission) and sent by the network interface 430 to the virtual conference provider via any intervening communications networks.

In this example, the client application 410 also includes a network test engine 414. The network test engine 414 includes processor-executable instructions to receive and execute test scripts to test various network functionality employed by the conference client application. In this example, it is a self-contained set of instructions that is separately compiled and linked from the conference client application and may be installed into or removed from the conference client application as needed.

The network test engine 414 (or "engine 414") provides an API and testing framework that connects to internal functionality within the client application 410 to enable the engine 414 to control the client application 410. In addition, the engine 414 includes processor-executable instructions to connect to a protocol stack 440 (whether provided by the client application 410, an operating system of the client device 400, or a combination of different entities) and obtain information about data moving through the protocol stack 440, whether inbound to the client application 410 or outbound from the client application 410.

The engine 414 may be installed when the client application 410 is installed on the client device 400; however, because the engine 414 is entirely self-contained, it may be installed sometime after the client application 410 has been installed. For example, if a user is experiencing apparent network or other issues during virtual conferences, they may request the engine 414 be downloaded and installed. In addition, the user may uninstall the engine 414 after resolving issues identified by a network test. Though in some examples, the engine 414 may be permanently installed as a part of the client application 410.

To perform one or more tests or diagnostics, a user may select an option within the client application's GUI to run a test and may select one or more available test scripts or functionality to test. Test scripts may be generated by the virtual conference provider and provided to users to assist with troubleshooting issues occurring when using the client application 410. Based on the type of issue encountered, the user may select an appropriate test script to execute.

The test scripts may include a series of instructions or commands that may be interpreted by the engine 414 to cause it to perform the programmed test. For example, a test script may specify a test of audio and video transmissions to the virtual conference provider. Upon executing the test script, the network test engine commands the conference client application to start and join a new virtual meeting via the virtual conference provider, to enable the microphone 402 and camera 404, and to provide audio and video streams to the virtual conference provider. The client application 410, in response to receiving the commands, communicates with the virtual conference provider to establish and join a new virtual conference, enable the microphone 402 and camera 404, and provide the resulting audio and video streams to the virtual conference provider within the virtual meeting. Further, some examples may include instructions to cause the virtual conference provider to emulate one or more client devices to send simulated audio or video streams from emulated participants, provide simulated chat conversations, simulated sub-meetings, etc.

During this process, the engine 414 can monitor the signaling data exchanged between the client device 400 and the virtual conference provider by accessing the protocol stack 440 and data that is packetized (or otherwise prepared for transmission via the network interface 430) or extracted from received data packets. For example, the engine 414 may access data at different layers of the protocol stack 440, such as at the data link layer, the application layer, the web layer, etc., to examine communication protocol information that may be carried in a header, packet payload, or footer. It may also examine packets or other protocol data received that acknowledges receipt of transmitted packets to obtain route information, latency information, jitter information, dropped packet information, or other parameters. It can also monitor application-level signaling messages to and responses from the virtual conference provider, which may indicate issues occurring during setup of the virtual meeting or the process of joining the virtual meeting, such as login or other authorization issues, which server or servers are involved in the processes, resource issues within the virtual conferencing provider's own infrastructure, or other parameters.

Once the virtual conference is setup and joined, the engine 414 may monitor the transmission of the audio and video streams, including the parameters discussed above, e.g., latency and jitter. It may also monitor parameters associated with the client device 402, such as which audio or video encoders are used, processor and memory utilization, network interface 430 utilization, and other applications executing on the client device. By executing within the context of the client application 410, the test engine has access to information that a convention network monitor or diagnostic tool would not. Thus, it can provide a much richer set of test or diagnostic data for a network or application engineer, or to provide to the user of the client device to apprise them of higher-level status information, such as network congestion or instability or resource consumption on their client device.

The engine 414 can gather various diagnostic or test data, which it can store in a log in the data store 420, or it can forward the log information to the virtual conference provider. In some cases, it can provide the diagnostic or test data to the user, such as in a logging window or as summary information, which may provide high-level status of one or more parameters associated with the client device, the client application 410, network communications, or the virtual conference provider. For example, the engine 414 may display via a GUI window that network performance has low latency, moderate jitter, and moderate congestion, based on corresponding thresholds for each parameter, while also providing exact latency, jitter, and congestion information in a log and associated with corresponding timestamps.

Figure 5:
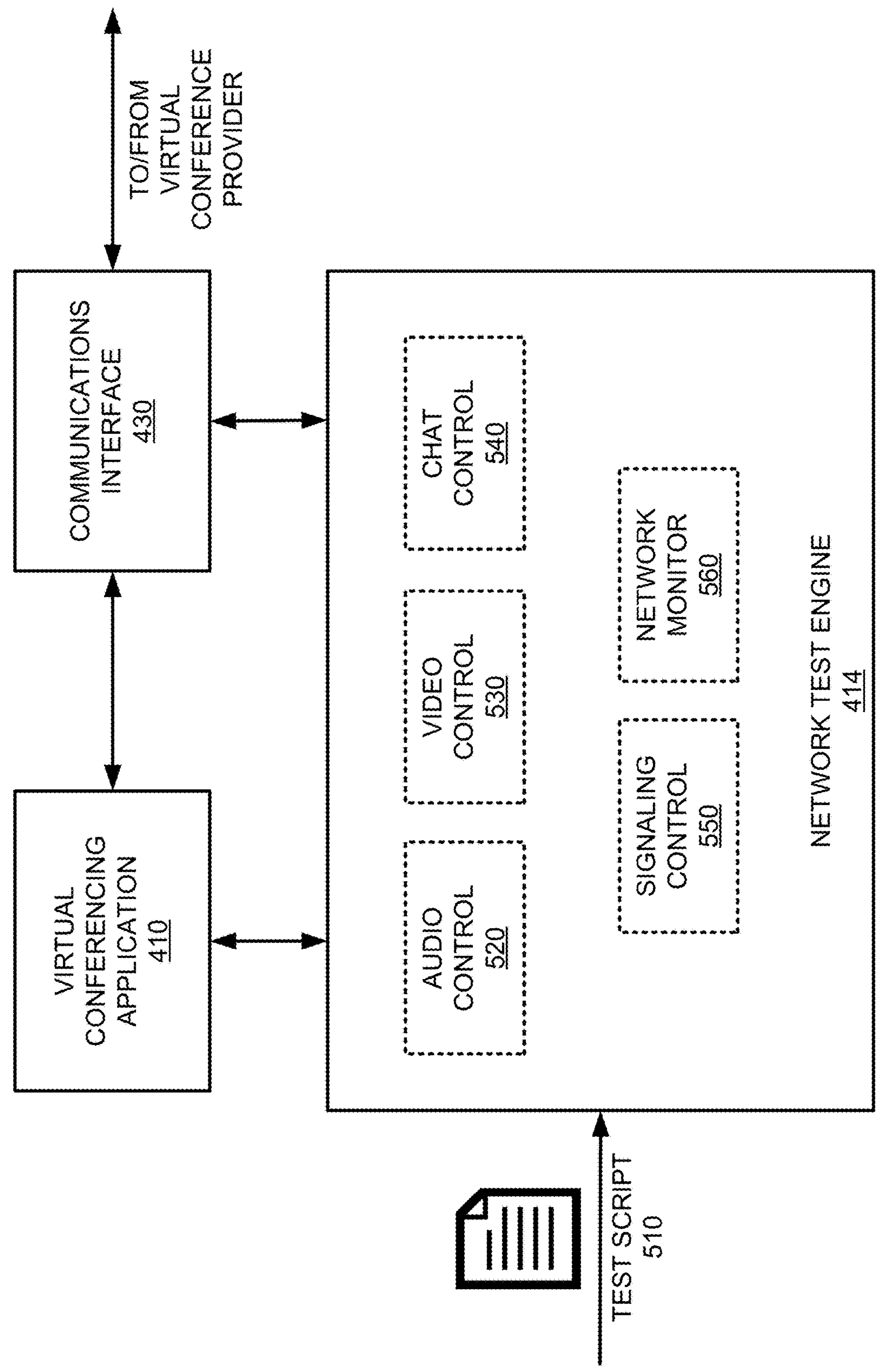
FIG. 5 shows an example network test engine for integrated network testing for virtual conferencing.

Referring now to FIG. 5, FIG. 5 shows the functionality provided by the network test engine 414 as well as interaction pathways between the networking engine 414, the virtual conferencing application 410 and the network interface 430. The engine 414 can provide commands to, and receive information from, the client application 410 to execute tests or diagnostics according to received test scripts 510. To provide commands to the client application 410, the engine 414 includes different types of controls: audio and video control 520, 530, chat control 540, and signaling control 550. Each of these controls 520-550 is configured to control corresponding functionality within the virtual conferencing application 410. In addition, the engine 414 includes a network monitor 560 that can access a protocol stack 440 and the communications interface 430 to monitor individual data packets.

For example, the audio control 520 includes API functionality to access and enable audio capture via the client application 410, such as by enabling a microphone 402, selecting an audio encoder or decoder, receiving raw or encoded audio, or providing the received audio to packetization functionality within the client application 410 to construct an application-level packet for transmission to the virtual conference provider. It can also monitor execution times of each of these functionalities, such as whether encoding and transmission occurs within predefined windows or whether audio buffers are being emptied at a sufficient rate to ensure seamless audio is provided to the virtual conference provider. If audio is encoded or transmitted with too much latency between audio packets, such as due to resource utilization on the client device 400, e.g., the processor, audio quality at the receiver may be degraded as there may be noticeable gaps in the received audio stream. Similarly, the video control 530 can control and monitor video capture for similar functionality, including encoder selection and monitoring encoding and transmission timing or delays. Moreover, the audio or video control 520, 530 may include additional information within audio or video data to assist with diagnostics or testing. For example, the audio or video control 520, 530 may insert sequence numbers or IDs, such as by inserting integer count values, into audio or video packets to determine whether they are received by the virtual conference provider.

In addition, both the audio and video controls 520-530 can monitor received audio and video streams and control decoding and output of those streams. As with captured audio and video streams, decoding and output of such streams affects the quality of the user experience. If audio or video streams including time gaps due to networking issues or resource utilization at the client device, the audio and video controls 520 can detect such issues, log them, and provide indications to the user. Further, because incoming audio and video streams may be subject to packet loss, the audio and video controls may be configured to detect dropped audio or video packets, such as based on sequence IDs that may be carried in audio or video packets, or discontinuities in audio or video output from successive audio or video frames. Such sequence IDs may be included by default by the client application 410 or virtual conference provider, or may be specifically requested by the audio or video control 520, 530 (or another control, such as signaling control 550) for the test. For example, successive audio packets may be decoded to generate successive portions of a continuous audio signal. The audio control may compare a difference between the end portion of one decoded audio packet and an initial portion of the next decoded audio packet. If the two audio signals do not align within a threshold amount, the audio control 520 may indicate one or more lost audio packets. Similarly, one or more dropped packet may be inferred based on the amount of time between two received audio or video packets. If video packets represent 10 millisecond ("ms") video samples, a gap of 32 ms may indicate a loss of at least two video packets.

Chat control 540 similarly is configured to interact with text chat functionality provided by the client application 410. It may be configured to enable text chat functionality within the client application 410 and, in some examples, provide test chat messages to send to the virtual conference provider. And while audio and video packets may be sent as connectionless packets, e.g., as universal datagram protocol ("UDP") packets, that do not employ retransmission, chat messages may employ a connection-oriented protocol, such as transmission control protocol ("TCP"), that attempts to guarantee delivery of a data packet. Thus, the chat control may interact with the virtual conferencing application to provide test chat messages or received chat messages entered by the user. It may then interact with the network monitor to determine whether and when a transmitted chat message is received by the virtual conference provider to measure network latency, dropped packets, route information, or other parameters.

Signaling control 550 includes processor-executable instructions to cause the engine to interact with the client application 410 or to send out-of-band communications to the virtual conference provider. For example, the signaling control 550 may interact with the client application 410 to initiate a new virtual conference by providing specific configuration parameters identified in the test script 510 for the virtual conference. It may also emulate user interactions with the client application, based on commands specified in the test script 510, to cause certain functionality to be employed or disabled. For example, the signaling control 550 may interact with the client application to enable recording of the virtual meeting or to request a transcript or translation of audio from the virtual meeting. Similarly, signaling control 550 may interact with internal components of the client application to affect its operation, such as by specifying a particular network interface 430 to use, if multiple are available, e.g., an ethernet interface, a WiFi interface, a cellular interface, or a tethered connection to another device via Bluetooth.

In addition to controlling aspects of the client application, signaling control 550 can also communicate with the virtual conference provider to indicate a test will take place and to request certain configurations within the virtual conference provider. For example, signaling control 550 can request that specific servers or multimedia equipment be employed, or that the virtual conference provider confirm receipt of video or audio packets or identify packets that are not received, which are not ordinarily tracked. Signaling control can also request the virtual conference provider provide information regarding when packets from the client application arrive and internal routing information within the virtual conference provider. Such information may be reported back to the signaling control 550 or it may be maintained at the virtual conference provider and combined with test or diagnostic results received from the engine 414 during or after a test script has been executed.

Finally, the network monitor 560 accesses the protocol stack 440 and the communications interface 430 to track the progress of data output by the client application 410 through the network to the virtual conference provider or received from the virtual conference provider. The network monitor 560 can inspect individual data packets at various levels of the protocol stack to determine protocol-level configurations and assess how different types of packets are being processed and transmitted through the network. It can monitor network parameters, including latency, jitter, congestion, and route information. It can also interact with the signaling control 550 to obtain information from the virtual conference provider.

While the network test engine 414 depicted in FIG. 5 has the components depicted and describe above, other examples may include more or fewer components, or the components may not be implemented as discrete components within the engine 414. Instead, the functionality provided by the engine 414 may be configured in any suitable way for the specific requirements of a particular virtual conference provider or other entity. Further, while the engine 414 has been described as operating within the context of a conference client application 410, a suitably configured engine may be integrated within any suitable client applications. For example, a virtual conference provider may offer many different applications for use by its customers or users. Each of these applications may be able to install and interact with a common network test engine 414 to assess their respective functionality. Since each of the application is designed by the virtual conference provider to interact with its infrastructure, a single network test engine 414 may be used for all of the different applications by providing a common API and application framework that can communicate with the virtual conference provider's infrastructure.

Figure 6A:
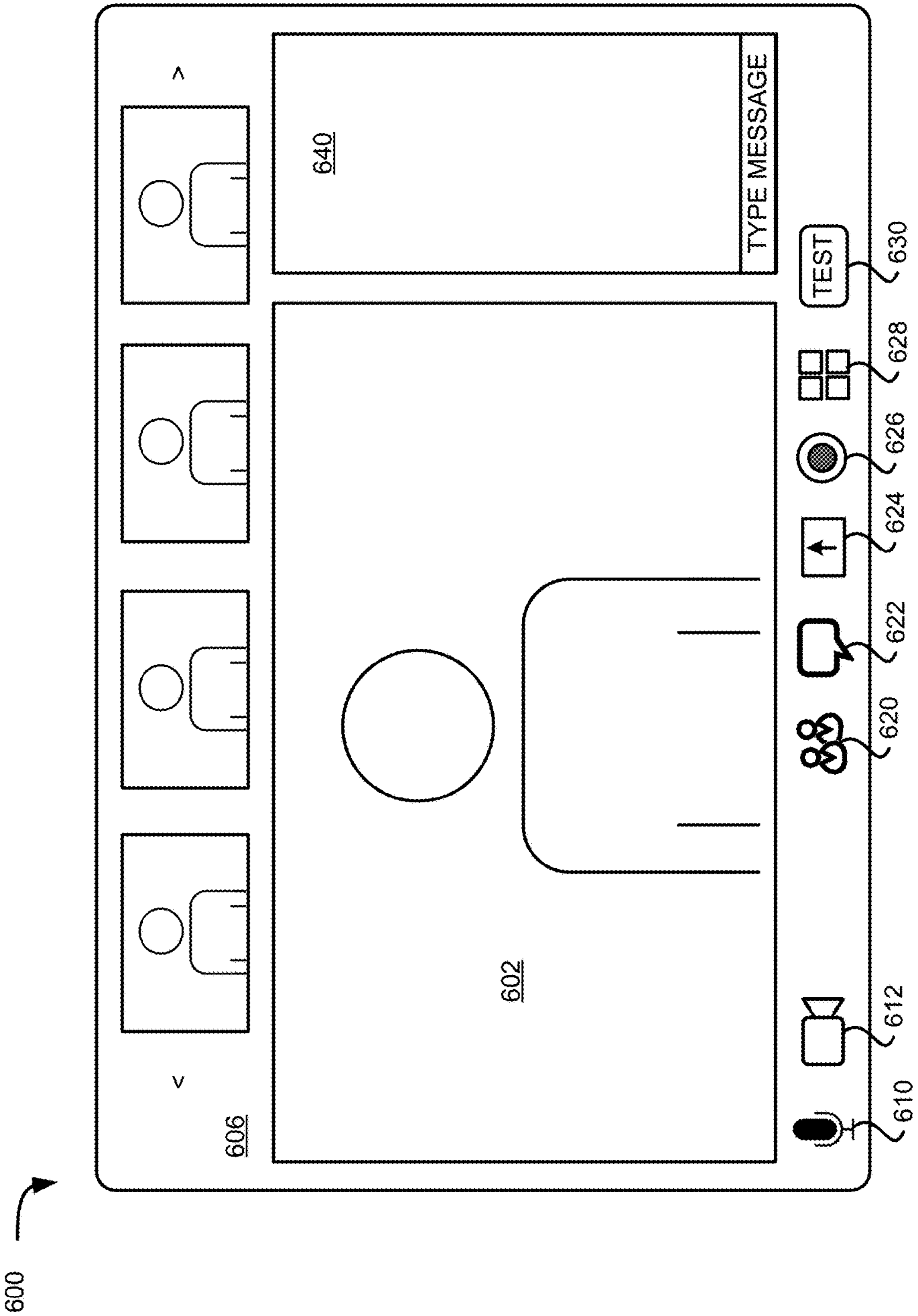
FIGS. 6A-6E shows example graphical user interfaces for integrated network testing for virtual conferencing.

Referring now to FIGS. 6A-6E, these figures illustrate a GUI for a client application, such as client application 410, that enables integrating network testing for virtual conferencing. FIG. 6A shows an example GUI for a client application in virtual conferences. A client device, e.g., client device 400, executes a software client 410, which in turn displays the GUI 600 on the client device's display. In this example, the GUI 600 includes a speaker view window 602 that presents the current speaker in the virtual conference. Above the speaker view window 602 are smaller participant windows 604, which allow the participant to view some of the other participants in the virtual conference, as well as controls ("<" and ">") to let the host scroll to view other participants in the virtual conference.

Beneath the speaker view window 602 are a number of interactive elements 610-630 to allow the participant to interact with the virtual conference software. Controls 610-612 may allow the participant to toggle on or off audio or video streams captured by a microphone or camera connected to the client device. Control 620 allows the participant to view any other participants in the virtual conference with the participant, while control 622 allows the participant to send text messages to other participants, whether to specific participants or to the entire meeting. Control 624 allows the participant to share content from their client device. Control 626 allows the participant toggle recording of the meeting, and control 628 allows the user to select an option to join a breakout room. Control 630 allows a user to initiate one or more tests using a network test engine 414. Finally, chat window 640 provides for the various participants to engage in text messaging during the virtual conference.

Figure 6B:
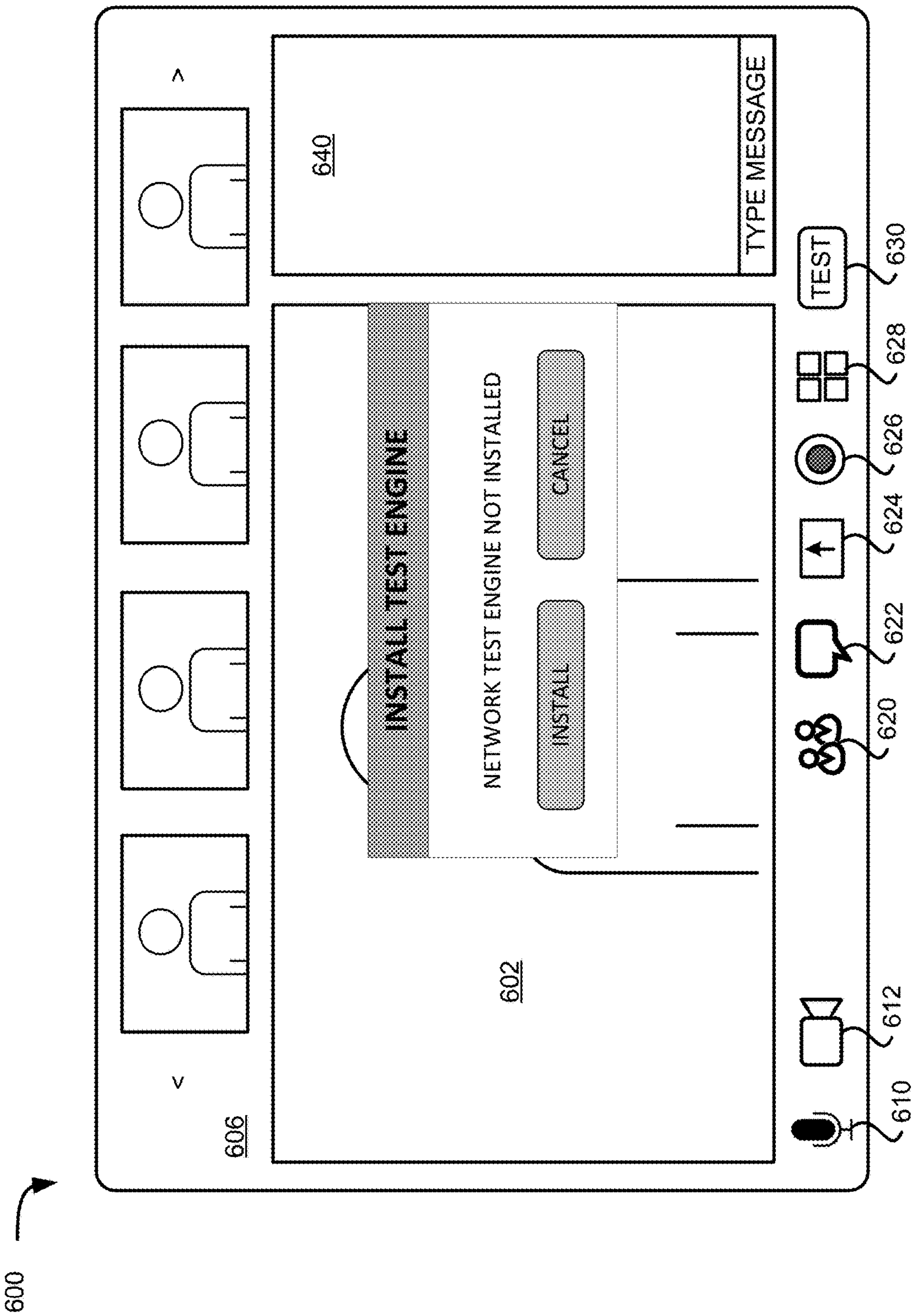

FIG. 6B illustrates the GUI 600 after the user has selected control 630 to perform one or more tests, but where the engine 414 has not been installed. However, as can be seen, after selecting the control 630, the GUI 600 informs the user that the network test engine 414 has not yet been installed and asks whether it should be installed. If the user selects the option to install the engine 414, the client application 410 will contact the virtual conference provider and download a copy of the engine 414. After receiving the engine 414, the client application 410 may verify that the engine was downloaded correctly, such as by comparing a checksum of the downloaded engine with a checksum provided by the virtual conference provider. It may also check a cryptographic signature included with the engine 414 to verify that it was signed by the virtual conference provider and has not been tampered with or replaced by a different engine by a malicious actor. Once the various checks have been successfully completed, the client application 410 installs the engine 414.

Figure 6C:
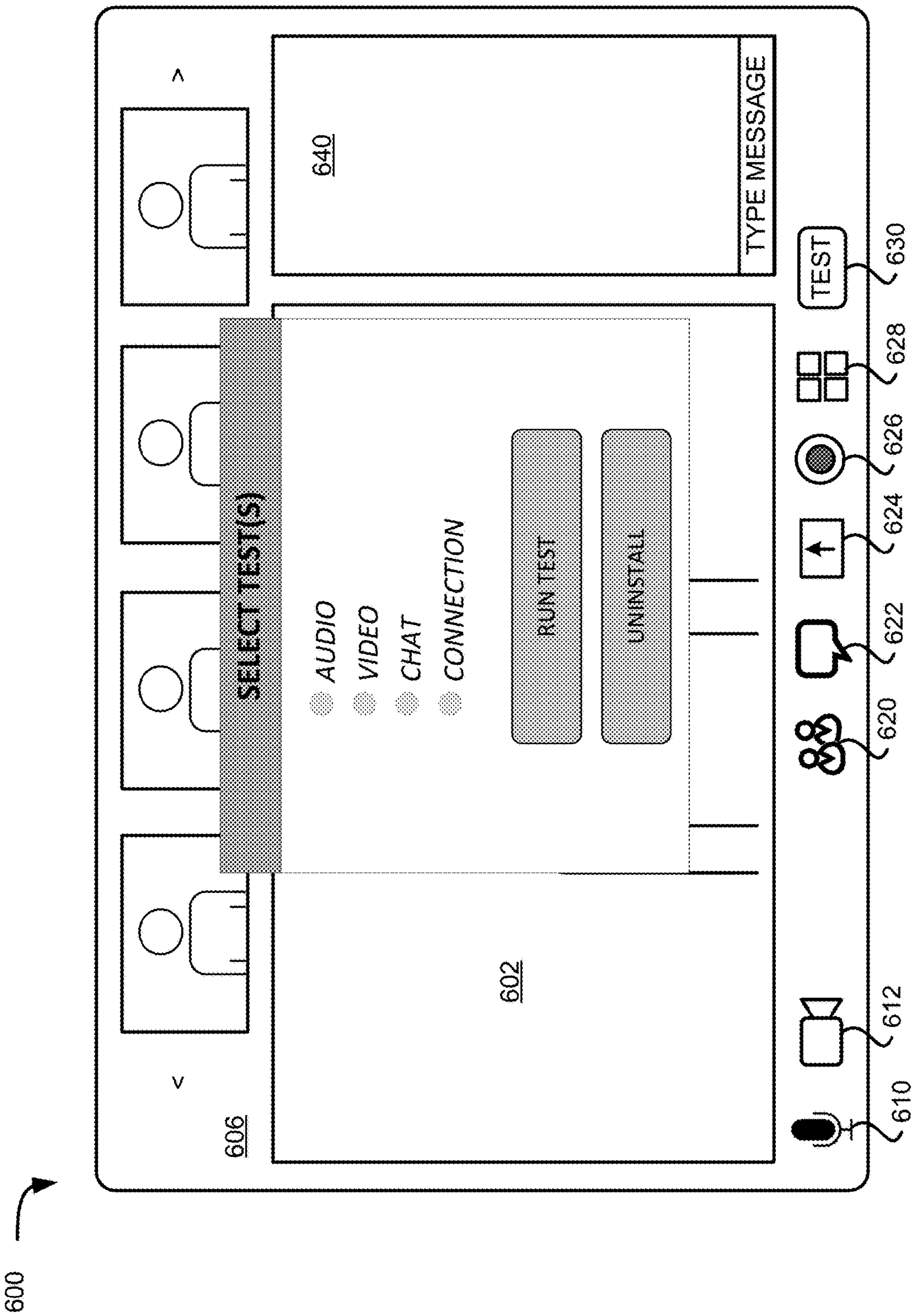

FIG. 6C illustrates the GUI 600 after the user has selected control 630 to perform one or more tests and the engine 414 has been installed. After selecting the control 630, the GUI 600 presents the user with test options for audio, video, chat, and connection tests, from which the user can select any one or more tests to run. After selecting the desired test(s), the user selects the "Run Test" option to begin the test(s). Alternatively, the user can select an option to uninstall the engine 414 from the client application 410. If the user selects the option to uninstall the engine 414, the client application 410 removes the engine 414.

In this example, the user is requesting to perform one or more tests during an on-going virtual meeting with various participants in attendance; however, the user may also select the option to perform one or more tests outside the context of a live virtual meeting. After selecting the desired tests, the client application 410 communicates with the virtual conference provider to obtain the corresponding test script(s) 510, if not already available at the client device 400, which it then provides to the engine 414 to perform the tests, generally as discussed above with respect to FIG. 5 and will be discussed in more detail below, and provide the results to the user, the virtual conference provider, or both.

Figure 6D:
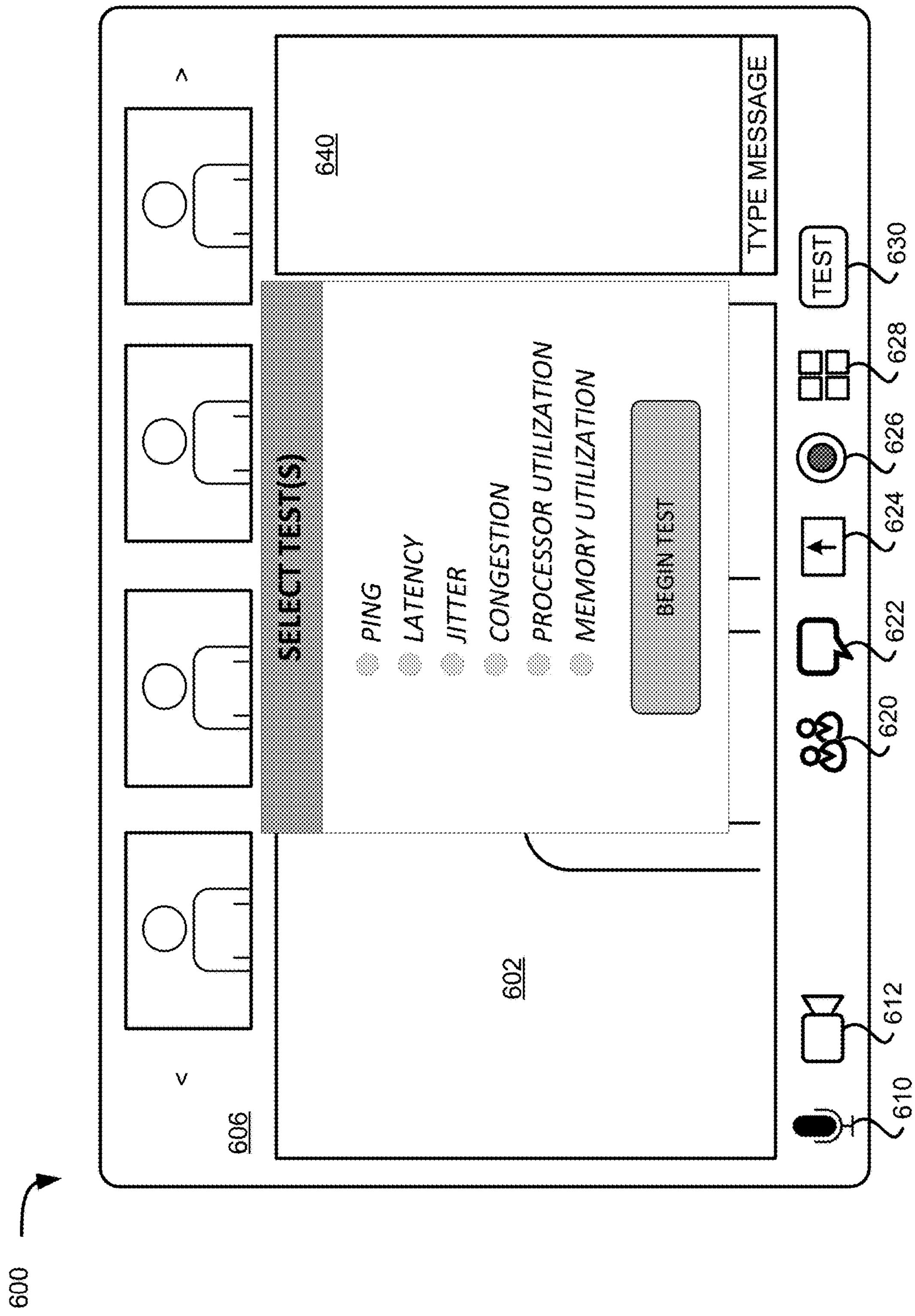

FIG. 6D illustrates additional options a user may select when performing a test. In this example, the user is presented with options for particular network and client device parameters to monitor, which include ping, latency, jitter, congestion, processor utilization, and memory utilization. The user may select any one or more of these options to gather and log, or otherwise provide, during the course of the selected test(s). And while these particular parameters have been identified in this example, any suitable parameters may be presented as options to the user in other examples.

Figure 6E:
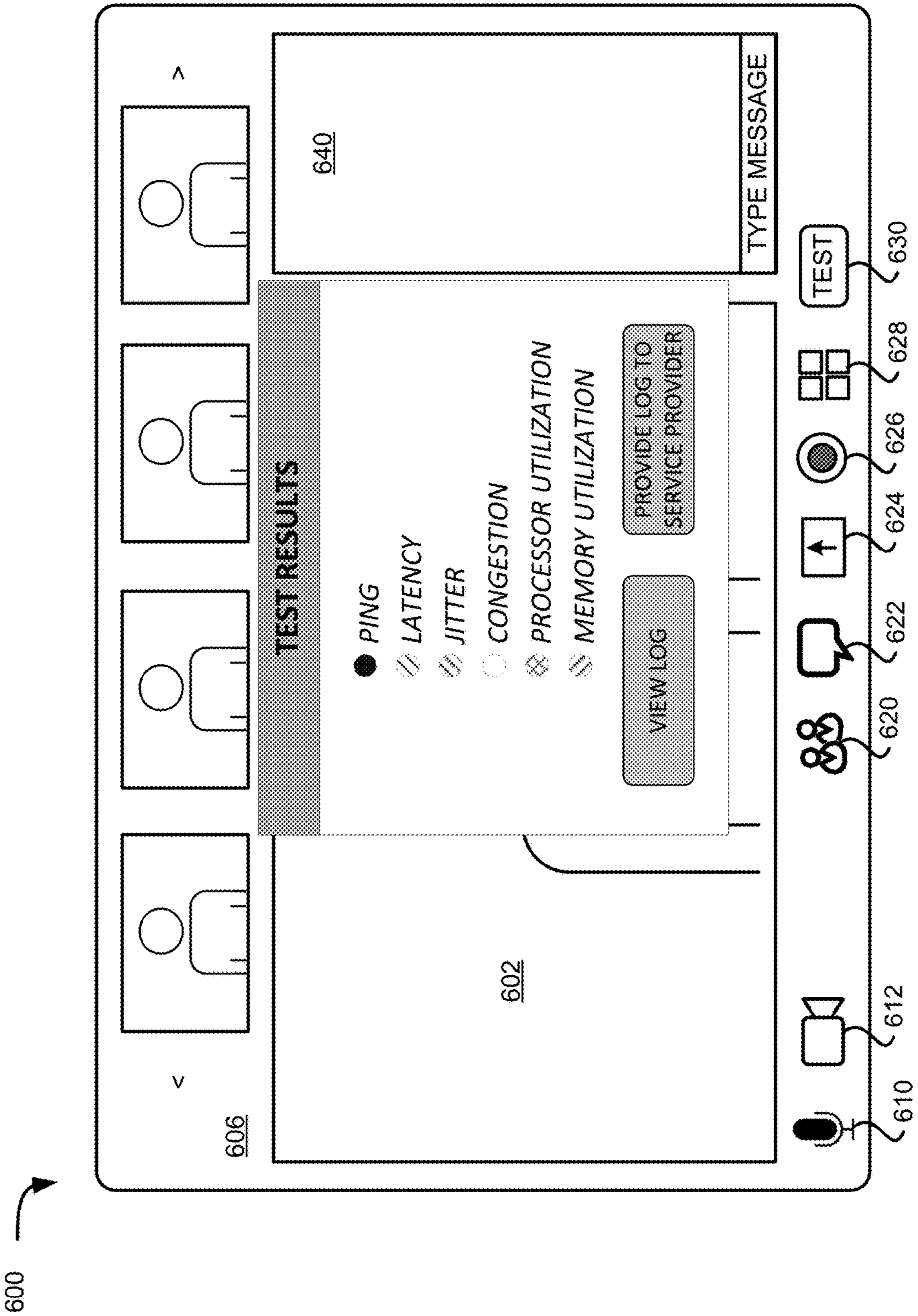

FIG. 6E shows an example indication of test results following execution of one or more test scripts. In this example, the engine 414 has output high-level indicators for each of the tested parameters, which indicate a relative score for each parameters. For example, the dark circle corresponding to ping indicates a "high" ping, such as over 500 ms, while the light circle corresponding to congestion indicates low network congestion or utilization, e.g., less than 10%. The remaining indicators indicate moderately high latency and jitter, while processor utilization is moderate, and memory utilization is moderately low. The GUI 600 also provides the user with the option to view the test log itself or to provide the test results to the service provider, such as the video conference provider.

Figure 7:
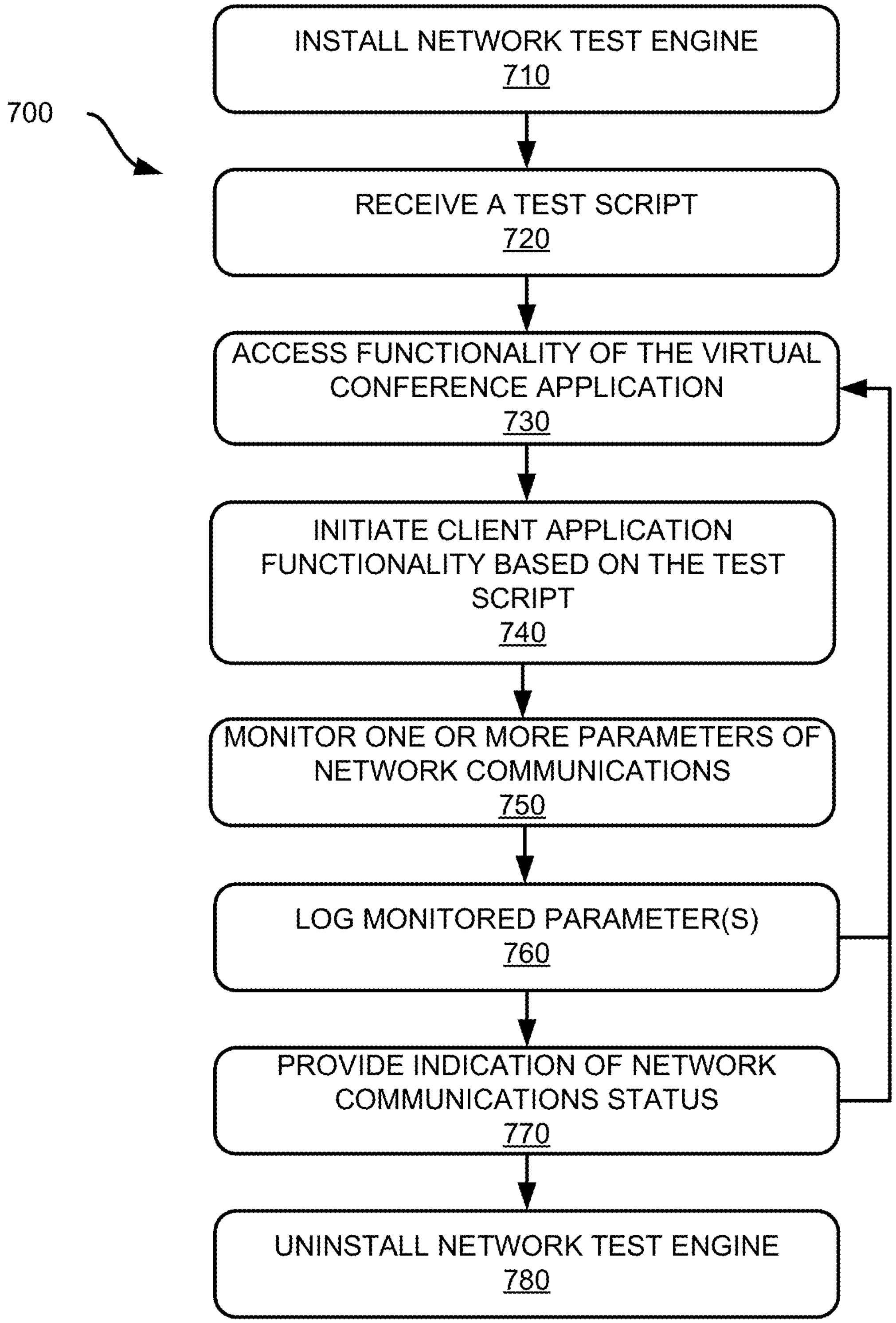
FIG. 7 shows an example method for integrated network testing for virtual conferencing.

Referring now to FIG. 7, FIG. 7 shows an example method 700 for integrated network testing for virtual conferencing. The example method 700 will be discussed with respect to the example system 300 shown in FIG. 3 and the client device 400 shown in FIG. 4; however, any suitable system or client device may be employed according to this disclosure.

At block 710, the client application 410 receives a request to install the network test engine 414. As discussed above with respect to FIGS. 6A-B, the user may select a control 630 presented in a GUI 600 to initiate a network test. If the network test engine 414 is not installed, the client application 410 asks the user whether they would like to install the engine 414. If the user selects the option to install the engine 414, the client application 410 requests a copy of the engine 414 from the virtual conference provider and downloads it. It may then verify that the download was successful or that the downloaded engine 414 is correctly cryptographically signed by the virtual conference provider. If either of these checks fails, the client application 410 may re-request the engine 414 or it may inform the user that the installation failed. If both checks are successful, the client application 410 then installs the engine 414. In some examples, the client application may then re-start to enable the test functionality or it may enable the test functionality on-the-fly without needing to restart. It should be appreciated that block 710 may be skipped in cases when the engine 414 is already installed in the client application 410.

At block 720, the client application 410 receives one or more test scripts 510. As discussed above with respect to FIGS. 6C-D, the user may select one or more functionalities to test, such as audio, video, chat, or a network connection, or one or more parameters to monitor, such as ping, latency, jitter, congestion, or processor or memory utilization. Based on the selected functionalities or parameters, the client application 410 may select one or more previously received test scripts 510 or it may request one or more test scripts 510 from the virtual conference provider. As discussed above, such test scripts 510 may be received during an on-going virtual conference or at a time when the user is not engaged in a virtual conference.

It should be appreciated that while one use case involves the user selecting one or more functionalities to test or one or more parameters to monitor, in some examples, the user may not have control over individual aspects of any tests. For example, the user may select the control 730, which then initiates a predetermined test script 510 without further user interactions. Further, in some examples, a customer support agent at the virtual conference provider may respond to complaints from a user about issues during a virtual conference or may monitor performance of a virtual conference and notice qualities issues. The customer support agent may transmit one or more messages to the user's client device 400 to cause the client application 410 to receive and execute one or more test scripts 510.

At block 730, the network test engine 414 accesses functionality of the conference client application 410. After receiving one or more test scripts 510, the network test engine 414 may execute the test script(s) 510 and consequently access functionality provided by the client application to be used by the test script 510.

For example, and as discussed above with respect to FIG. 5, audio control 520 or video control 530 may access audio or video capture functionality, respectively, via API connections between the network test engine 414 and the client application 410. The engine 414 may send commands via the API connections to instruct the client application 410 to select or enable a microphone 402 or camera 404. Similarly, the signaling control 550 may send commands via the API to cause the client application 410 to create a new virtual meeting, to record a virtual meeting, to request transcript of a virtual meeting, to change the arrangement of participant windows 606 in the GUI 600, activate any of the controls 620-628 available within the GUI 600, or create or join a sub-meeting. Still other controls may access any other functionality provided by the client application 410. It should be appreciated that accessed functionality may include user-controllable functionality, such as enabling a microphone or camera, or functionality that is not directly accessible by the user, such as a type of audio or video encoder, network configuration parameters, or one or more layers of the protocol stack 440. Each type of accessible functionality may be accessed via one or more API functions of the network test engine 414, which may communicate with corresponding functions within the client application 410.

At block 740, the engine 414 initiates client application functionality based on the test script 510. In this example, the engine 414 executes test scripts 510 one by one, though, in some examples, multiple test scripts 510 may be executed simultaneously, such as discrete audio and video test scripts.

As the engine 414 executes instructions within a test script 510, it initiates corresponding client application functionality, such as by enabling a camera to generate a video stream or by initiating or joining a virtual conference at the virtual conference provider.

At block 750, the engine 414 monitors one or more parameters of network communications between the conference client application 410 and the virtual conference provider. As discussed above with respect to FIGS. 4 and 5, the engine 414 can monitor network conditions, such as ping time from the client device 400 to the virtual conference provider, or an individual server at the virtual conference provider, latency, jitter, dropped packets, network bandwidth usage, network route information, local area network configuration or type, or network firewall configuration information.

Various communications issues can arise due to network configurations. For example, certain network traffic can be blocked or delayed by improperly configured firewalls, which can cause audio or video interruptions during a virtual conference. Similarly, a local area network connection at the client device may provide indications of network issues. For example, if the client device 400 employs a WiFi network interface 430, network parameters such as receive signal strength indicator ("RSSI"), SSID (service set identifier) or frequency band (e.g., 2.4 or 5 GHz) may affect network communications. Similarly other LAN settings may be monitored, such as quality-of-service settings or bandwidth restrictions. Each of these, as well as others, is an example of a parameter of network communications that may be monitored.

Within the client application 410, communications may be affected by processor or memory utilization. For example, if a user is running multiple applications concurrently with the virtual conference, the combined resource usage may cause insufficient processor or memory availability (or both) for the client application 410 leading to delays in audio or video encoding, resulting in audio or video quality issues at the other participants' client devices. Each of these may be parameters associated with the client device, though because they impact network communications, they may be monitored as network communication parameters.

In addition to detecting issues along the data transmission path, the monitoring may include monitoring issues along the data receive path. For example, the test engine may track the reception and decoding of incoming audio or video data. It can access data packets within different layers of the protocol stack to determine if packets are being dropped, e.g., by identifying missing sequence numbers or by measuring times between received audio or video packets, or whether resource utilization is impacting decoding of audio or video data. And while a number of different parameters of network communications are discussed above, any suitable parameters may be specified and monitored according to different examples.

At block 760, the engine 414 may log the monitored one or more parameters of network communications to a data store. For example, each monitored parameter may be logged to a log file or database record along with various information, including a timestamp corresponding to a logged event, network configuration parameters, or a type of data traffic. The log may then be stored in a local data store 420 or provided to the virtual conference provider. It should be appreciated the logging functionality may be omitted in some examples or may not be used. For example, if the user is not familiar with reading network logs, such functionality may not be selected by the user, who may instead simply view indications of the monitored parameters generated at block 770.

At block 770, the engine 414 provides an indication of network communications status based on the monitored one or more parameters. For example, the log file may constitute the indication in some examples. Further, a visual indication may be provided in some examples. For example, during or after the test script is executed, the GUI 600 may provide a textual or graphical indication of various monitored parameters. For example, indicates may be provided for each of the monitored parameters, e.g., latency, jitter, etc. to indicate whether the corresponding parameter is within one or more predefined ranges, such as "good," "acceptable," and "poor." In some examples, a real-time graph of parameter values changing may be provided. In other examples, numerical information, such as dropped packets or video or audio encoding/decoding times or buffer status, may be presented to provide precise measurements to the user of one or more parameters. Still other indications may be provided according to different examples. Further, it should be appreciated that the engine 414 may not provide indications in some examples. Instead, it may generate a log at block 760, which may be provided to a network engineer or other personnel at the virtual conference provider to determine any issues uncovered by the test script(s) 510.

At block 780, after the test script(s) have been executed and the tests are complete, the user may select an option to uninstall to network test engine 414. As discussed above, because the network test engine 414 is a discrete software package that may be installed into the client application, it may also be removed when it is no longer needed. Thus, the user can dynamically install or remove testing functionality as desired. Because this example engine 414 employs an API to connect to the client application 410, it can be easily installed or removed on demand. Further, such a modular design allows the testing capabilities to be enhanced over time without requiring the user to update the client application 410 as whole each time new testing functionality, which the user may not need at a particular time, is released.

Figure 8:
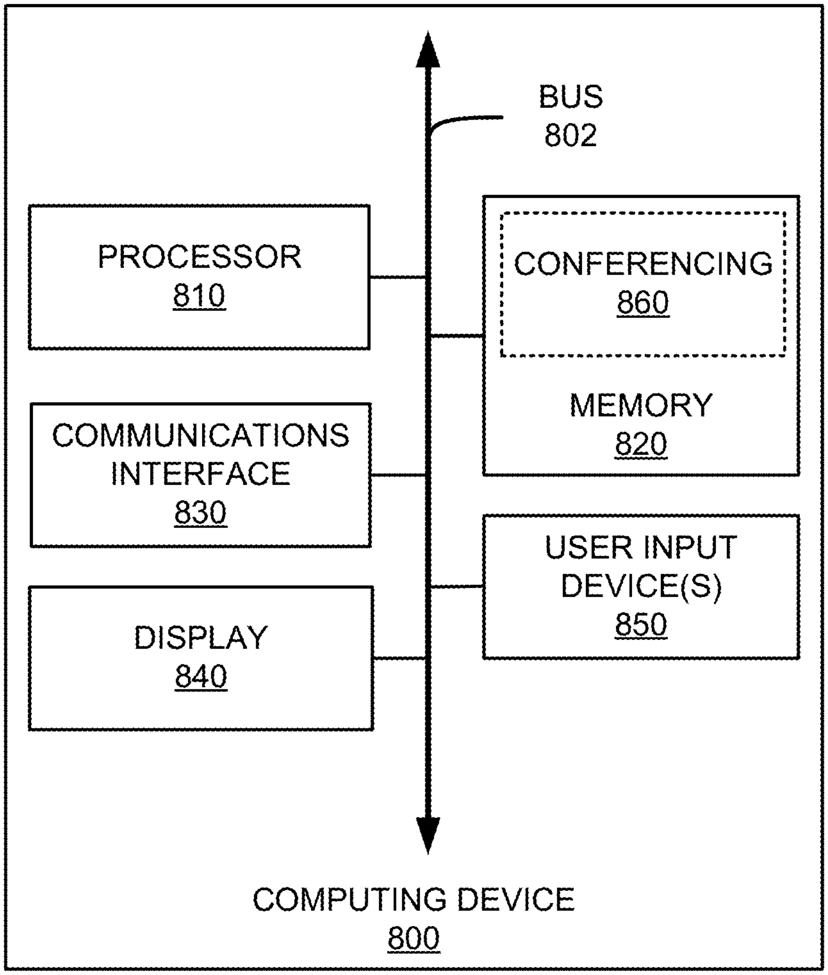
FIG. 8 shows an example computing device suitable for systems and methods for integrated network testing for virtual conferencing.

Referring now to FIG. 8, FIG. 8 shows an example computing device 800 suitable for use in example systems or methods for integrated network testing for virtual conferencing according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for integrated network testing for virtual conferencing according to different examples, such as part or all of the example method 800 described above with respect to FIG. 7. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes a conferencing client application 860 to enable a user to join and participate in one or more virtual conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 800 also includes a communications interface 840. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method, comprising:

receiving, by a network test engine on a client device, a test script including instructions for testing operation of a conference client application located on the client device, wherein the network test engine is configured to test the operation of the conference client application on the client device in accordance with the test script, and wherein the network test engine is associated with the conference client application;

testing, by the network test engine on the client device, the operation of the conference client application on the client device by following the instructions in the test script, wherein testing the conference client application involves:

initiating, by the network test engine interacting with the conference client application on the client device, functionality of the conference client application based on the test script;

monitoring, by the network test engine, one or more parameters of network communications employed by the functionality, the network communications being between the conference client application and a virtual conference provider;

modifying, by the network test engine, a communication to be sent to the virtual conference provider by the conference client application; and transmitting, by the conference client application, the modified communication to the virtual conference provider; and providing, by the network test engine on the client device, an indication of network communications status based on the monitored one or more parameters.

2. The method of claim 1, wherein monitoring the one or more parameters of the network communications employed by the functionality comprises monitoring one or more of network latency, network bandwidth, network jitter, dropped packets, network route information, or network firewall configuration information.

3. The method of claim 1, further comprising:

accessing, by the network test engine, the functionality of the conference client application through an application programming interface (API) provided by the conference client application.

4. The method of claim 1, wherein the functionality is network functionality.

5. The method of claim 1, further comprising:

accessing, by the network test engine via the conference client application, at least one of a camera or a microphone associated with the client device, initiating, by the network test engine via the conference client application, one or more video or audio streams using the camera or the microphone;

transmitting, by the network test engine via the conference client application, the one or more video or audio streams to the virtual conference provider; and wherein the monitoring the one or more parameters of network communications is associated with the one or more transmitted video or audio streams.

6. The method of claim 1, further comprising:

receiving, by the network test engine via the conference client application, one or more video or audio streams from the virtual conference provider; and wherein the monitoring the one or more parameters of network communications is associated with the one or more received video or audio streams.

7. The method of claim 1, further comprising:

requesting, by the conference client application from the virtual conference provider, the network test engine;

receiving and verifying the network test engine; and responsive to verification of the network test engine, installing the network test engine within the conference client application.

8. The method of claim 1, further comprising providing results of the monitoring to the virtual conference provider.

9. The method of claim 1, further comprising:

installing the network test engine into the conference client application; and after testing the conference client application, uninstalling the network test engine from the conference client application.

10. A client device comprising:

a non-transitory computer-readable medium storing a network test engine and a conference client application; and one or more processors communicatively coupled to the non-transitory computer-readable medium, the one or more processor configured to execute processor-executable instructions stored in the non-transitory computer-readable medium to perform operations including:

receiving a test script including instructions for testing operation of the conference client application located on the client device, wherein the network test engine is configured to test the operation of the conference client application on the client device in accordance with the test script;

testing, by the network test engine on the client device, the operation of the conference client application on the client device by following the instructions in the test script, wherein testing the conference client application involves:

initiating, by the network test engine interacting with the conference client application on the client device, functionality of the conference client application based on the test script;

monitoring, by the network test engine, one or more parameters of network communications employed by the functionality, the network communications being between the conference client application and a virtual conference provider;

modifying, by the network test engine, a communication to be sent to the virtual conference provider by the conference client application; and transmitting, by the conference client application, the modified communication to the virtual conference provider; and providing, by the network test engine on the client device, an indication of network communications status based on the monitored one or more parameters.

11. The client device of claim 10, wherein monitoring the one or more parameters of the network communications employed by the functionality comprises monitoring one or more of network latency, network bandwidth, network jitter, dropped packets, network route information, or network firewall configuration information.

12. The client device of claim 10, wherein the operations further comprise:

requesting, by the conference client application from the virtual conference provider, the network test engine;

receiving and verifying the network test engine; and responsive to verification of the network test engine, installing the network test engine within the conference client application.

13. The client device of claim 10, wherein the operations further comprise providing results of the monitoring to the virtual conference provider.

14. The client device of claim 10, wherein the operations further comprise:

installing the network test engine into the conference client application; and after testing the conference client application, uninstalling the network test engine from the conference client application.

15. A non-transitory computer-readable medium comprising processor- executable instructions configured to cause one or more processors of a client device to perform operations including:

receiving a test script including instructions for testing operation of a conference client application located on the client device, wherein a network test engine on the client device is configured to test the operation of the conference client application on the client device in accordance with the test script;

testing, by the network test engine on the client device, the operation of the conference client application on the client device by following the instructions in the test script, wherein testing the conference client application involves:

initiating, by the network test engine interacting with the conference client application on the client device, functionality of the conference client application based on the test script;

monitoring, by the network test engine, one or more parameters of network communications employed by the functionality, the network communications being between the conference client application and a virtual conference provider;

modifying, by the network test engine, a communication to be sent to the virtual conference provider by the conference client application; and transmitting, by the conference client application, the modified communication to the virtual conference provider; and providing, by the network test engine on the client device, an indication of network communications status based on the monitored one or more parameters.

16. The non-transitory computer-readable medium of claim 15, wherein the operations further comprise:

modifying the communication by inserting data into the communication.

17. The non-transitory computer-readable medium of claim 16, wherein the data includes a sequence number or identifier.

18. The non-transitory computer-readable medium of claim 15, wherein the operations further comprise:

transmitting data to the virtual conference provider by causing the conference client application to transmit a communication comprising the data to the virtual conference provider.

19. The non-transitory computer-readable medium of claim 15, wherein the operations further comprise:

receiving an input, from a user of the conference client application, for initiating the testing of the conference client application; and in response to receiving the input from the user, performing the testing of the conference client application using the network test engine.

20. The non-transitory computer-readable medium of claim 19, wherein the input is received from the user via a graphical user interface of the conference client application.

* * * * *